United States Patent [19]
Tsunoda

[11] Patent Number: 5,899,505
[45] Date of Patent: May 4, 1999

[54] PIPING JOINT STRUCTURE

[75] Inventor: Isao Tsunoda, Wako, Japan

[73] Assignee: Honda Giken Kogyo Kabushiki Kaisha, Tokyo, Japan

[21] Appl. No.: 08/808,985

[22] Filed: Feb. 20, 1997

[30] Foreign Application Priority Data

Feb. 20, 1996 [JP] Japan ................................. 8-032305

[51] Int. Cl.⁶ .................................................. F16L 3/00
[52] U.S. Cl. ...................................... 285/62; 285/124.1
[58] Field of Search .................................. 285/62, 124.1, 285/124.2, 124.3, 124.4, 124.5

[56] References Cited

U.S. PATENT DOCUMENTS

| | | | |
|---|---|---|---|
| 1,981,424 | 11/1934 | Lake ................................. | 285/124.1 X |
| 3,516,691 | 6/1970 | Williams et al. ..................... | 285/124.4 |
| 5,071,169 | 12/1991 | Moschet ................................. | 285/62 |
| 5,209,440 | 5/1993 | Walker ................................ | 285/124.1 |
| 5,234,185 | 8/1993 | Hoffman et al. ..................... | 285/124.2 |

*Primary Examiner*—Dave W. Arola
*Attorney, Agent, or Firm*—Birch, Stewart, Kolasch & Birch, LLP

[57] ABSTRACT

A piping joint structure has a block joint disposed in a passenger's compartment and communicating with an evaporator, a first holder mounted on an end of a maintenance lid in the passenger's compartment closer to a dashboard panel, and a second holder combined with the first holder to hold the block joint on a side panel of a heater unit housing which confronts the dashboard panel.

16 Claims, 10 Drawing Sheets

PIPING JOINT STRUCTURE

BACKGROUND OF THE INVENTION

1. Field of the Invention

The present invention relates to a piping joint structure in an automotive air-conditioning unit for use on a motor vehicle such as an automobile.

2. Description of the Related Art

Figure 10:
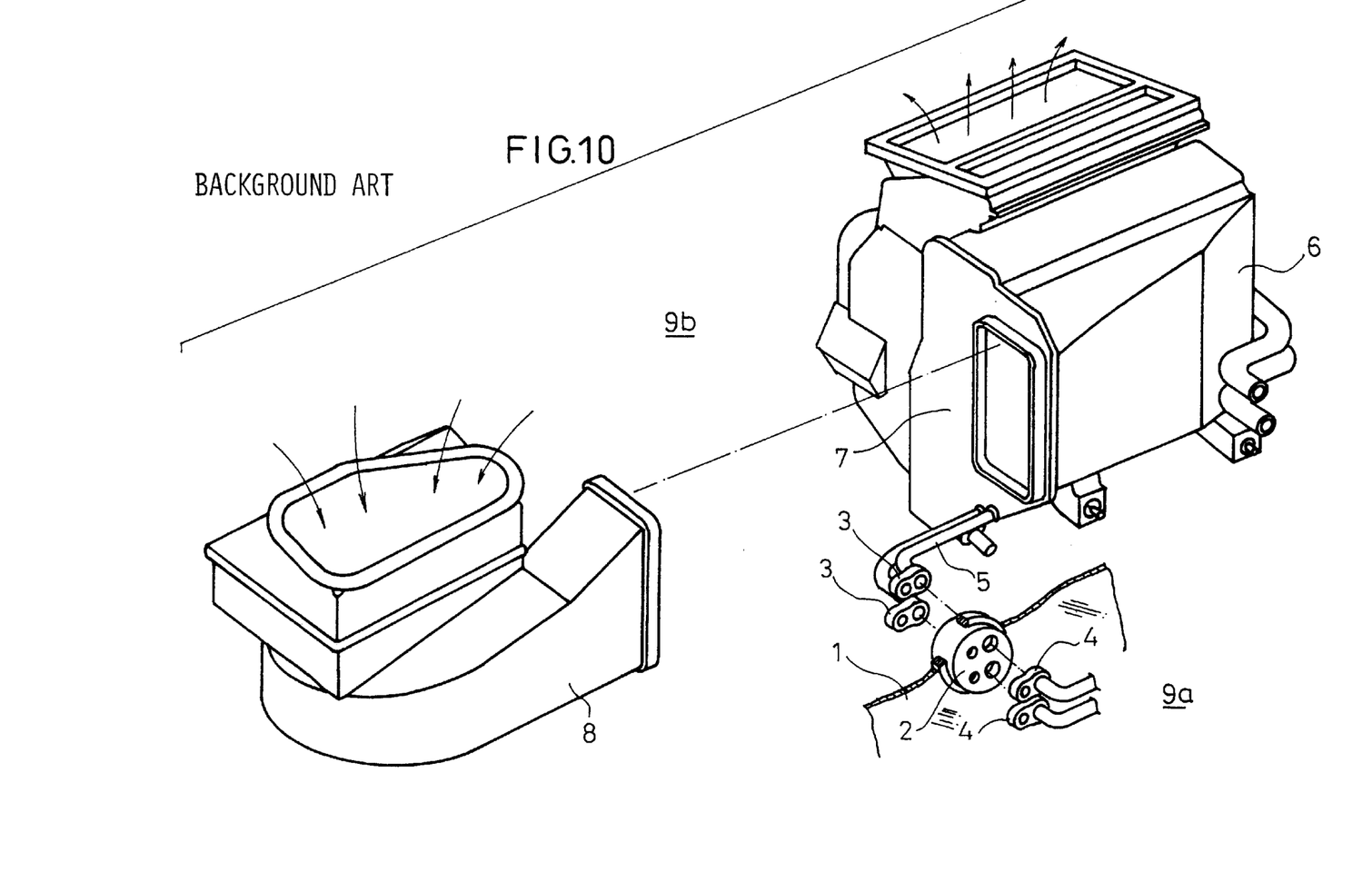
FIG. 10 is an exploded perspective view, partly broken away, of a conventional piping joint structure.

As shown in FIG. 10 of the accompanying drawings, one conventional piping joint structure in an automotive air-conditioning unit has a block joint 2 disposed in a through hole defined in a dashboard panel 1 which divides an engine compartment 9a and a passenger's compartment 9b from each other in an automobile. To the block joint 2, there are fastened joint members 3 in the passenger's compartment 9b and joint members 4 in the engine compartment 9a by screws (not shown). A heater unit 6 is connected to pipes 5 exposed in the passenger's compartment 9b, and a blower 8 is coupled to the heater unit 6 through a maintenance lid 7.

The illustrated conventional piping joint structure needs to have a heat-insulating member covered around the pipes 5, which interconnect the heat unit 6 and the joint members 3, to prevent water droplets from being deposited on outer surfaces of the pipes 5 due to condensation. As a consequence, the conventional piping joint structure is made up of a relatively large number of parts.

Since the joint members 3 and the joint members 4 which are connected respectively opposite sides of the block joint 2 are required, the number of parts of the conventional piping joint structure is also relatively large, resulting in a large cost required to manufacture the conventional piping joint structure.

When an air-conditioning unit is to be assembled, the joint members 3 and the joint members 4 have to be fastened to the block joint 2 by screws. For maintenance of the air-conditioning unit, it is necessary to remove the joint members 3, which are installed in a relatively small space, from the block joint 2. Consequently, the processes of assembling the air-conditioning unit and servicing the air-conditioning unit for maintenance are complex and time-consuming.

SUMMARY OF THE INVENTION

It is a general object of the present invention to provide a piping joint structure which is made up of a relatively small number of parts and can be manufactured inexpensively.

A major object of the present invention is to provide a piping joint structure which can be assembled and serviced for maintenance easily in a short period of time.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
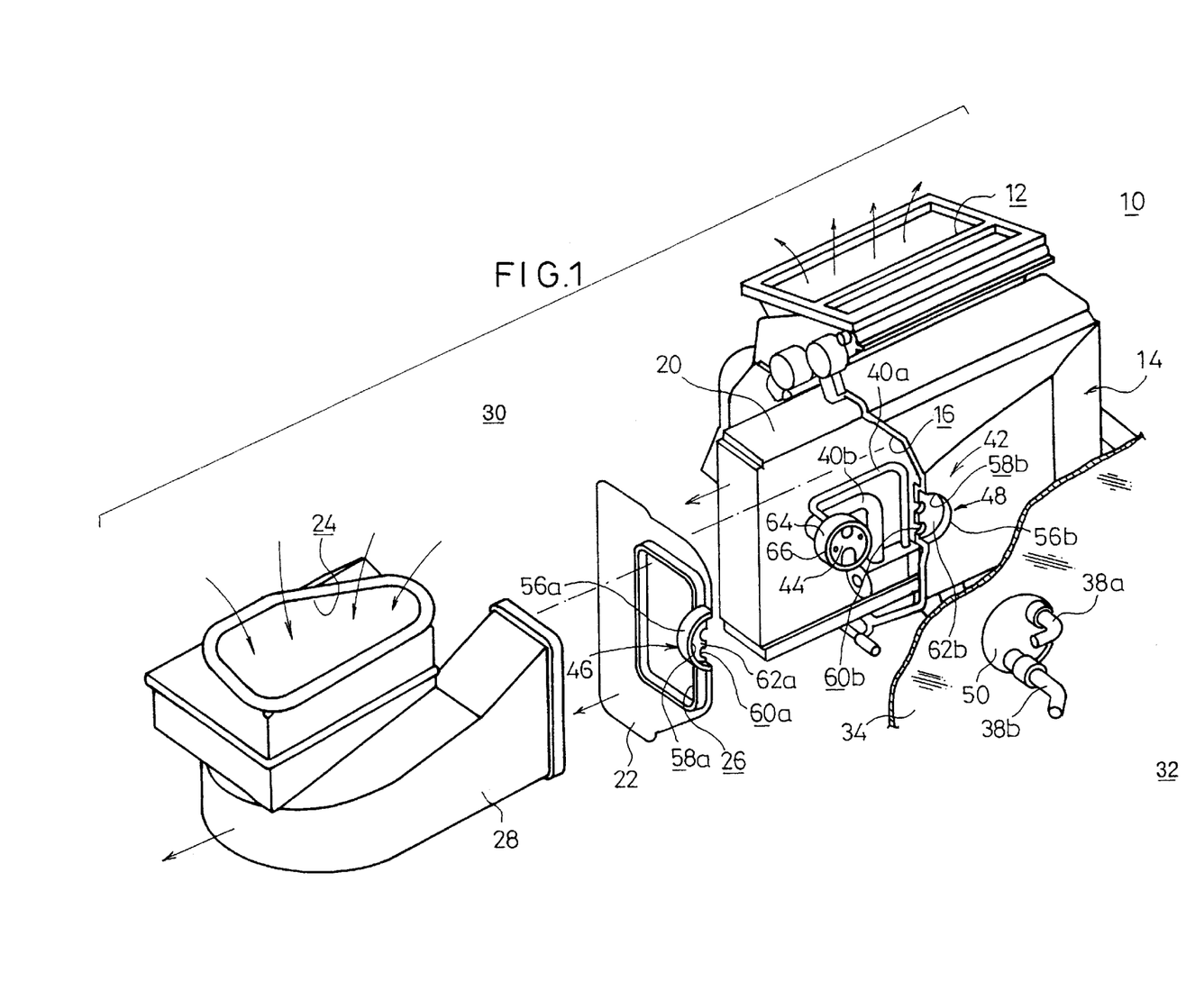
FIG. 1 is an exploded perspective view, partly broken away, of an air-conditioning unit which incorporates a piping joint structure according to the present invention.

FIG. 1 shows an air-conditioning unit 10 which incorporates a piping joint structure according to the present invention.

As shown in FIG. 1, the air-conditioning unit 10 comprises a heater unit housing 14 having a cool air outlet 12 for introducing cool air into a passenger's compartment 30 of an automobile, an evaporator 20 removably disposed in a space 18 (see FIG. 2) in the heater unit housing 14 for removal through an opening 16 in the heater unit housing 14, the evaporator 20 being capable of depriving air in the passenger's compartment of heat with a coolant passing in the evaporator 20 for thereby cooling the air in the passenger's compartment 30, a maintenance lid 22 for openably closing the opening 16, an air inlet 24 for drawing the air in the passenger's compartment 30, and a blower 28 for delivering the air drawn from the air inlet 24 under pressure through an opening 26 in the maintenance lid 22 into the evaporator 20.

Figure 2:
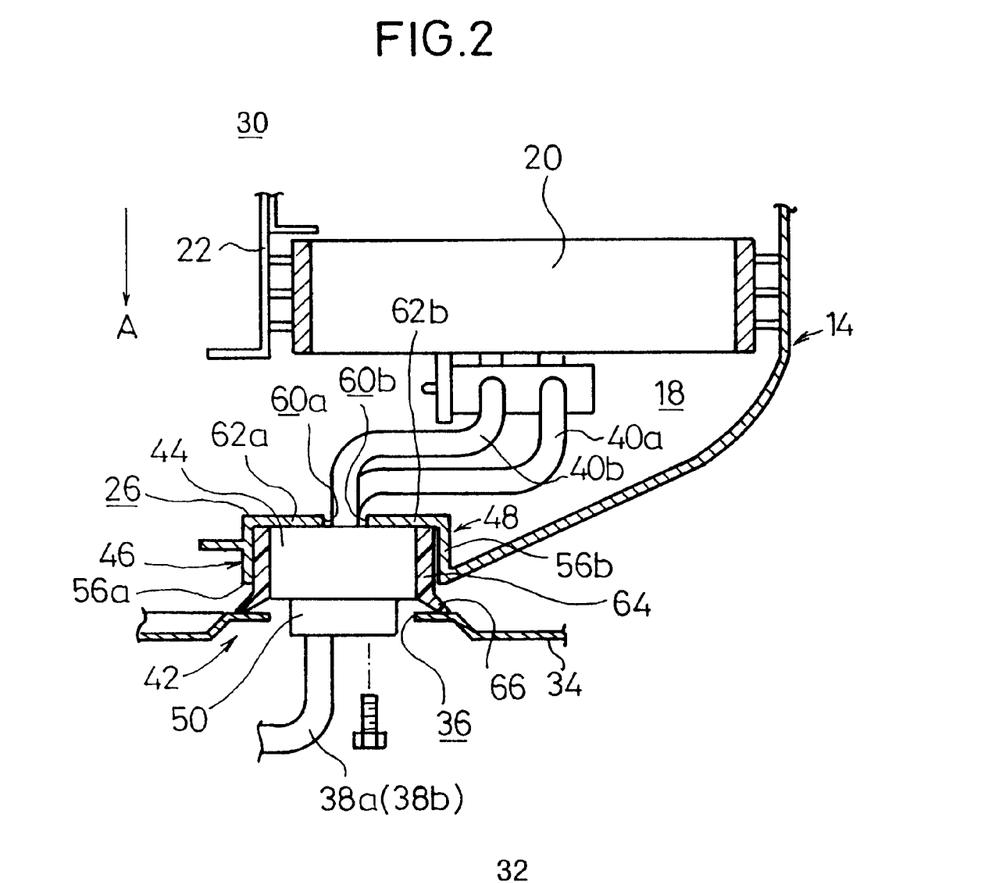
FIG. 2 is a fragmentary cross-sectional view of the piping joint structure shown in FIG. 1.

As shown in FIG. 2, the heater unit housing 14, the evaporator 20, and the blower 28 are disposed in the passenger's compartment 30. The passenger's compartment 30 is separated from an engine compartment 32 by a dashboard panel 34 which has a through hole 36. The through hole 36 houses therein a piping joint structure 42 which interconnects first coolant pipes 38a, 38b connected to an air-conditioning unit device such as a condenser or the like in the engine compartment 32 and second coolant pipes 40a, 40b connected to the evaporator 20.

The second coolant pipe 40a serves to deliver a gaseous coolant from the evaporator 20 to a compressor (not shown). The second coolant pipe 40b serves to introduce a liquid coolant from the condenser (not shown) into the evaporator 20. The second coolant pipes 40a, 40b are connected to and communicate with respective coolant passages (not shown) defined in the evaporator 20.

The piping joint structure 42 comprises a disk-shaped block joint (first joint member) 44 connected ends of the second coolant pipes 40a, 40b, a first holder 46 integral with an end of the maintenance lid 22, a second holder 48 integral with an end of the heater unit housing 14 at the opening 16, and a joint member (second joint member) 50 which interconnects the first coolant pipes 38a, 38b in the engine compartment 32 and the second coolant pipes 40a, 40b in the passenger's compartment 30.

As shown in FIGS. 1, 2, and 3A, 3B, the first and second holders 46, 48 are of a symmetrical shape and have respective arcuately curved portions 56a, 56b extending along an outer circumferential surface of the block joint 44, respective arcuate recesses 58a, 58b complementary to semicircular shapes of the block joint 44, and respective engaging panel portions 62a, 62b having engaging holes 60a, 60b surrounding the outer circumferential surfaces of the second pipes 40a, 40b when the first and second holders 46, 48 are combined with each other. When the maintenance lid 22 is mounted on the heater unit housing 14 along the edge of the opening 16, the first and second holders 46, 48 are combined with each other. Specifically, the engaging panel portion 62a of the first holder 46 and the engaging panel portion 62b of the second holder 48 are held in abutment against each other, holding the second coolant pipes 40a, 40b in the engaging holes 60a, 60b. At the same time, the curved portions 56a, 56b and the engaging panel portions 62a, 62b surround the outer circumferential surface of the block joint 44, which is now held on a side panel of the heater unit housing 14.

A tubular seal member 64 is fitted over the outer circumferential surface of the block joint 44. The tubular seal member 64 has an annular skirt 66 (see FIG. 2) projecting from the block joint 44 toward the dashboard panel 34 and held in contact with the dashboard panel 34, thereby hermetically sealing the through hole 36.

Operation and advantages of the air-conditioning unit 10 which incorporates the piping joint structure 42 will be described below.

First, the operation of the air-conditioning unit 10 will briefly be described below.

A high-temperature, high-pressure coolant which has been compressed by the compressor (not shown) in the engine compartment 32 is delivered into the condenser, which cools the coolant. Water and dirt are removed from the coolant discharged from the condenser, and then the coolant is introduced into an expansion valve, which atomizes the coolant into a low-pressure low-temperature mist.

The mist of the coolant is then introduced through the first coolant pipe 38a and the second coolant pipe 38b which are interconnected by the piping joint structure 42 into the evaporator 20. In the evaporator 20, the mist of the coolant is evaporated by absorbing heat from high-temperature air around the evaporator 20, i.e., air in the passenger's compartment 30. The gaseous coolant thus produced in the evaporator 20 is then delivered through the second coolant pipe 40b and the first coolant pipe 38b back into the compressor.

The above cycle is repeated to circulate the coolant between the compressor and the evaporator 20 for thereby cooling the air in the passenger's compartment 30.

A process of installing the first coolant pipes 38a, 38b and the second coolant pipes 40a, 40b on the evaporator 20 with the piping joint structure 42 will be described below.

In a preparatory stage, the opening 16 in the heater unit housing 14 in which the evaporator 20 is housed is closed by the maintenance lid 22, and the block joint 44 is held on the side panel of the heater unit housing 14. The blower 28 has been joined to the maintenance lid 22. Specifically, when the maintenance lid 22 is attached to close the opening 16 in the heater unit housing 14, the engaging panel portion 62a of the first holder 46 and the engaging panel portion 62b of the second holder 48 abut against each other, holding the second coolant pipes 40a, 40b in the engaging holes 60a, 60b. At the same time, the curved portions 56a, 56b and the recesses 58a, 58b surround the outer circumferential surface of the block joint 44, which is now held on a side panel of the heater unit housing 14.

Therefore, when the first and second holders 46, 48 are combined with each other, the block joint 44 is directly held on the side panel of the heater unit housing 14 which confronts the dashboard panel 34.

As a result, since the second coolant pipes 40a, 40b connected to the block joint 44 are housed in the space 18 in the heater unit housing 14 without being exposed outside of the heater unit housing 14 (see FIG. 2), it is not necessary to cover the second coolant pipes 40a, 40b with a heat-insulating member. The piping joint structure 42 is made up of a relatively small number of parts, and can be manufactured relatively inexpensively.

Then, the heater unit housing 14 is moved toward the dashboard panel 34 in the direction indicated by the arrow A (FIG. 2), and positioned to hold the block joint 44 in alignment with the through hole 36 in the dashboard panel 34. The joint member 50 is fastened to the block joint 44 by a screw which is tightened through the through hole 36 from the engine compartment 32. At this time, the through hole 36 is hermetically sealed by the annular skirt 66 of the seal member 64 which is fitted over the block joint 44. In this manner, the second coolant pipes 40a, 40b in the passenger's compartment 30 and the first coolant pipes 38a, 38b in the engine compartment 32 are connected to and held in communication with each other.

In this embodiment, the second coolant pipes 40a, 40b and the first coolant pipes 38a, 38b can be joined to each other simply by connecting the joint member 50 from the engine compartment 32 through the through hole 36 to the block joint 44 integrally held on the heater unit housing 14 in the passenger's compartment 30. Therefore, inasmuch as the piping joint structure 42 does not need to employ joint members in the passenger's compartment 30 to be connected to the block joint 44, the piping joint structure 42 is made up of a relatively small number of parts, and can be manufactured relatively inexpensively.

Furthermore, joint members are not required to be fastened in two opposite directions, i.e., from the passenger's compartment 30 and the engine compartment 32, as is the case with the conventional piping joint structure. Since it is necessary to connect the joint member 50 to the block joint 44 in one direction only, the second coolant pipes 40a, 40b and the first coolant pipes 38a, 38b can be joined to each other easily within a short period of time.

Because the joint member 50 is joined to one side of the block joint 44, there is only one joint surface involved in connecting the second coolant pipes 40a, 40b and the first coolant pipes 38a, 38b to each other. Consequently, the piping joint structure 42 improves the reliability of hermetic sealing across the joint between the second coolant pipes 40a, 40b and the first coolant pipes 38a, 38b.

A process of disconnecting the first coolant pipes 38a, 38b from the block joint 44 in the passenger's compartment 30 and serving the evaporator 20 for maintenance will be described below.

The screw which connects the joint member 50 to the block joint 44 is loosened from the engine compartment 32 to separate the block joint 44 from the joint member 50. Then, the blower 28 and the maintenance lid 22 in the passenger's compartment 30 are displaced in the direction indicated by the arrows in FIG. 1, separating the first holder 46 on the maintenance lid 22 from the second holder 48 on the heater unit housing 14. The block joint 44 held on the side panel of the heater unit housing 14 is now released from the first and second holders 46, 48. The evaporator 20 is now movable through the opening 16 in the heater unit housing 14 in the direction indicated by the arrow in FIG. 1 along the dashboard panel 34, and can easily be removed from the heater unit housing 14.

For maintenance, therefore, when the joint member 50 is detached for the engine compartment 32, the block joint 44 can be separated from the dashboard panel 34, and the evaporator 20 can easily be removed along the dashboard panel 34.

According to the conventional piping joint structure shown in FIG. 10, it has been required to detach the joint members 3 from the block joint 2 from the passenger's compartment 9b and also to detach the joint members 4 from the block joint 2 from the engine compartment 9a. According to the present invention, however, it is only necessary to detach the joint member 50 in one direction from the engine compartment 32. As a consequence, the evaporator 20 can easily be detached and serviced for maintenance within a short period of time.

Figure 3A:
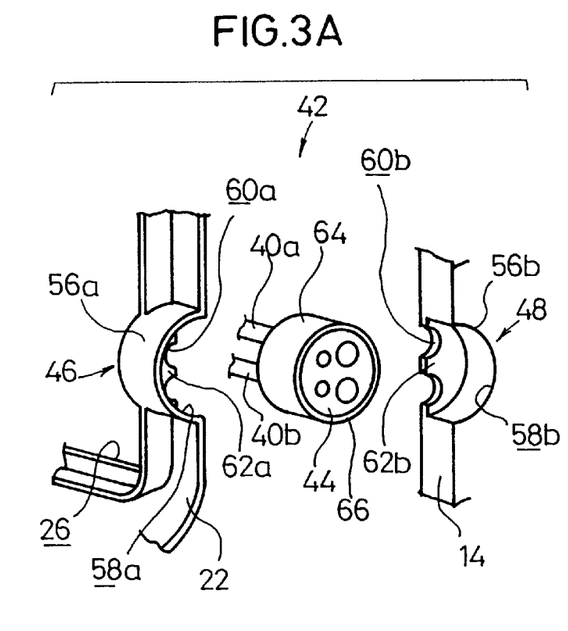
FIG. 3A is a perspective view of the piping joint structure shown in FIG. 1.
Figure 3B:
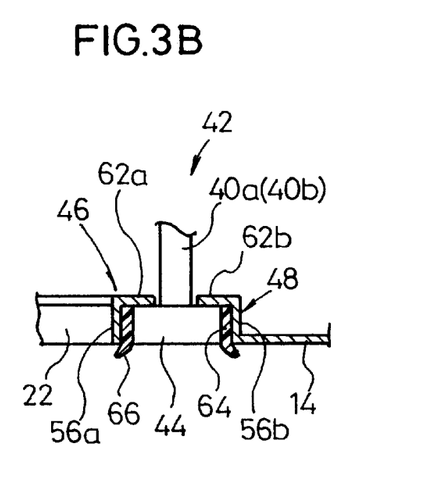
FIG. 3B is a transverse cross-sectional view of the piping joint structure shown in FIG. 1.

Modifications of the piping joint structure 42 will be described below with reference to FIGS. 4A, 4B and 5A, 5B. Those parts shown in FIGS. 4A, 4B and 5A, 5B which are identical to those of the piping joint structure shown in FIGS. 3A, 3B are denoted by identical reference numerals and designations, and will not be described in detail below.

Figure 4A:
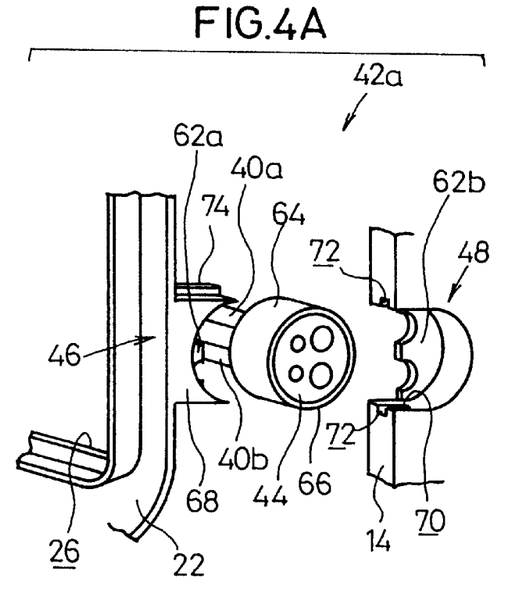
FIG. 4A is a perspective view of a modification of the piping joint structure shown in FIGS. 3A and 3B.
Figure 4B:
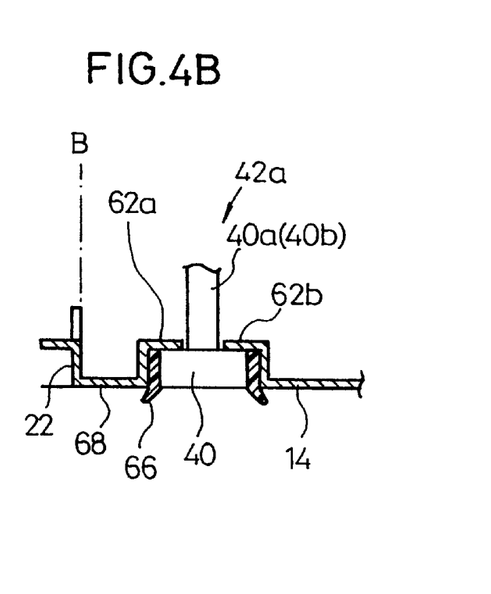
FIG. 4B is a transverse cross-sectional view of the modification of the piping joint structure shown in FIGS. 3A and 3B.

According to a modified piping joint structure 42a shown in FIGS. 4A and 4B, a protrusion 68 projecting toward the second holder 48 is integrally formed with an end of the maintenance lid 22, and the second holder 48 has a hole 70 defined therein for receiving the protrusion 68. When a pair of guide ridges 74 on opposite ends of the protrusion 68 slides in and along respective guide grooves 72 defined in opposite ends of the hole 70, the block joint 44 is held between the protrusion 68 and the edge which defines the hole 70.

Figure 5A:
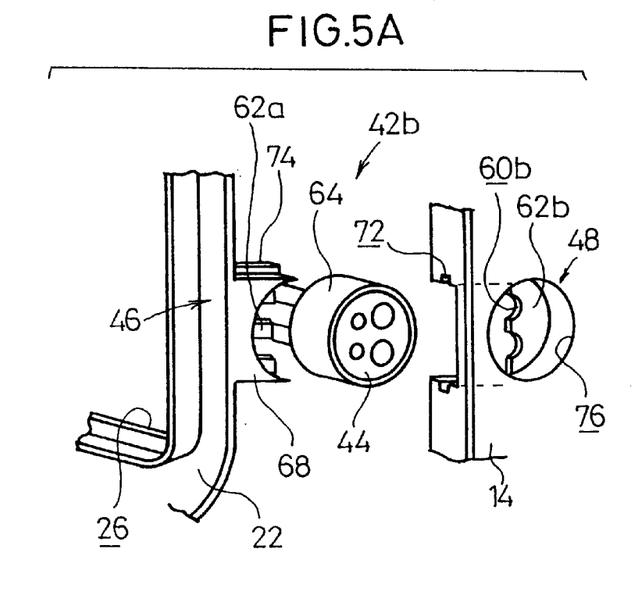
FIG. 5A is a perspective view of another modification of the piping joint structure shown in FIGS. 3A and 3B.
Figure 5B:
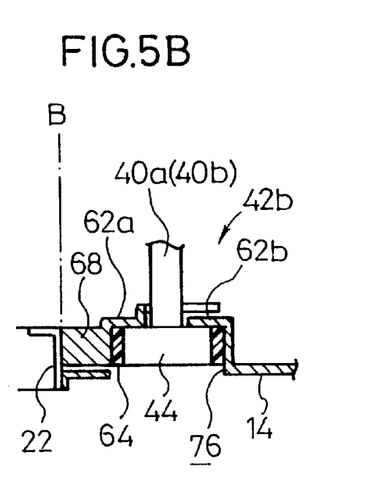
FIG. 5B is a transverse cross-sectional view of the other modification of the piping joint structure shown in FIGS. 3A and 3B.

A modified piping joint structure 42b shown in FIGS. 5A and 5B differs from the modified piping joint structure 42a shown in FIGS. 4A and 4B in that the second holder 48 has a circular opening 76 defined therein which is complementary in shape to the block joint 44.

The modified piping joint structures 42a, 42b shown in FIGS. 4A, 4B and 5A, 5B offer an advantage in that the maintenance lid 22 has a flange surface B which can be used as a positioning surface for positioning the maintenance lid 22 with respect to the heater unit housing 14. Other details of operation and advantages of the modified piping joint structures 42a, 42b are substantially the same as those of the piping joint structure shown in FIGS. 3A, 3B, and will not be described in detail.

FIGS. 6A through 6H show structures by which the through hole 36 in the dashboard panel 34 are sealed and manners in which the block joint 44 is removed for maintenance.

Figure 6A:
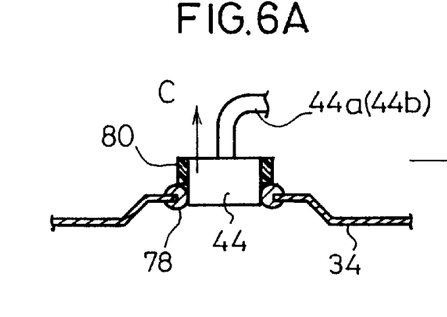
FIGS. 6A through 6H are transverse cross-sectional views showing structures by which a through hole in a dashboard panel is sealed and manners in which a block joint is removed for maintenance.
Figure 6B:
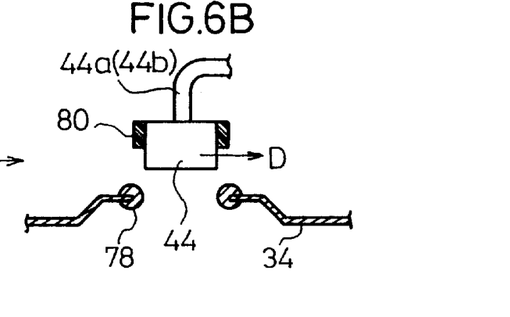

In FIGS. 6A, 6B, after the block joint 44 is pulled out toward the evaporator 20 in the direction indicated by the arrow C, the block joint 44 is slid along the dashboard panel 34 in the direction indicated by the arrow C. A grommet 70 is fitted in the through hole 36 in the dashboard panel 34. A seal ring 80 is mounted on the outer circumferential surface of the block joint 44 and held in contact with the grommet 78 to hermetically seal the through hole 36.

Figure 6C:
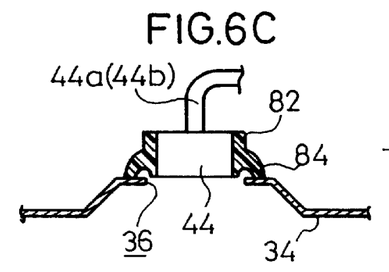
Figure 6D:
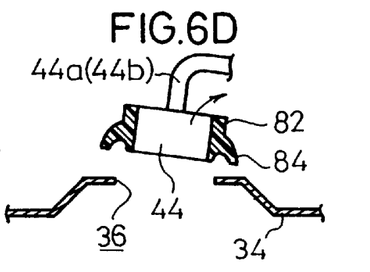
Figure 6E:
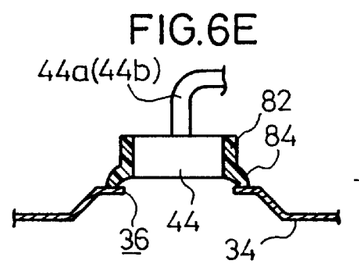
Figure 6F:
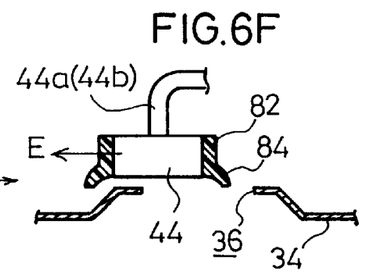

In FIGS. 6C, 6D, the block joint 44 is detached toward the evaporator 20 and removed away from the dashboard panel 34. A seal member 82 is fitted over the block joint 44 and has an annular ridge 84 projecting radially outwardly therefrom. When the annular ridge 84 is pressed against the dashboard panel 34, it closes the through hole 36 for hermetically sealing the through hole 36.

In FIGS. 6E, 6F and 6G, 6H, the block joint 44 is not pulled toward the evaporator 20, but is simply slid along the dashboard panel 34 in the direction indicated by the arrow E.

Figure 6G:
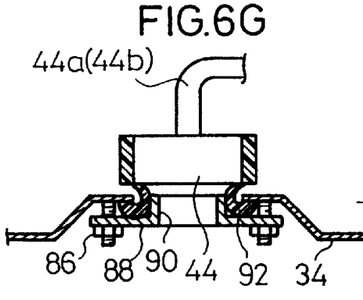
Figure 6H:
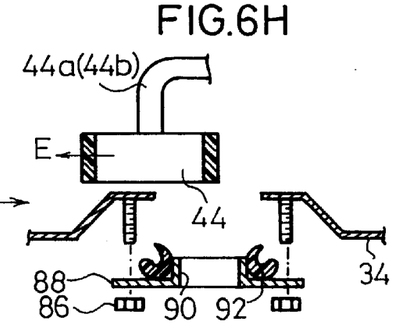

As shown in FIGS. 6G, 6H, an annular member 88 is fastened to the dashboard panel 34 by bolts and nuts 86 in the engine compartment 86. A seal member 92 is fitted over a flange 90 of the annular member 88 and projects a certain length toward the passenger compartment 30. When the annular member 88 is fastened to the dashboard panel 34, the seal member 92 is pressed against the block joint 44 to seal the opening 36. When the nuts 86 are loosened and the annular member 88 is removed, the block joint 44 can be slid along the dashboard panel 34 in the direction indicated by the arrow E.

Figure 7:
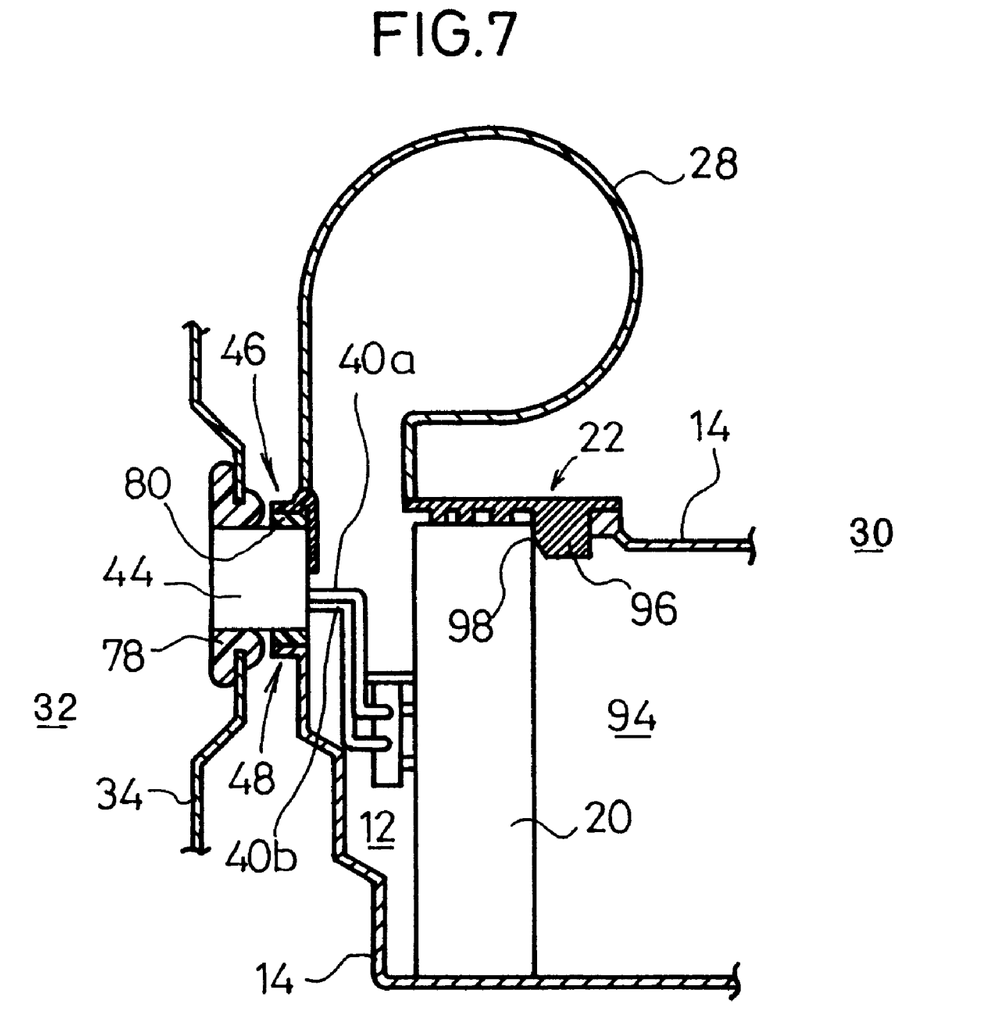
FIG. 7 is a transverse cross-sectional view of a structure which includes a space for moving an evaporator.
Figure 8:
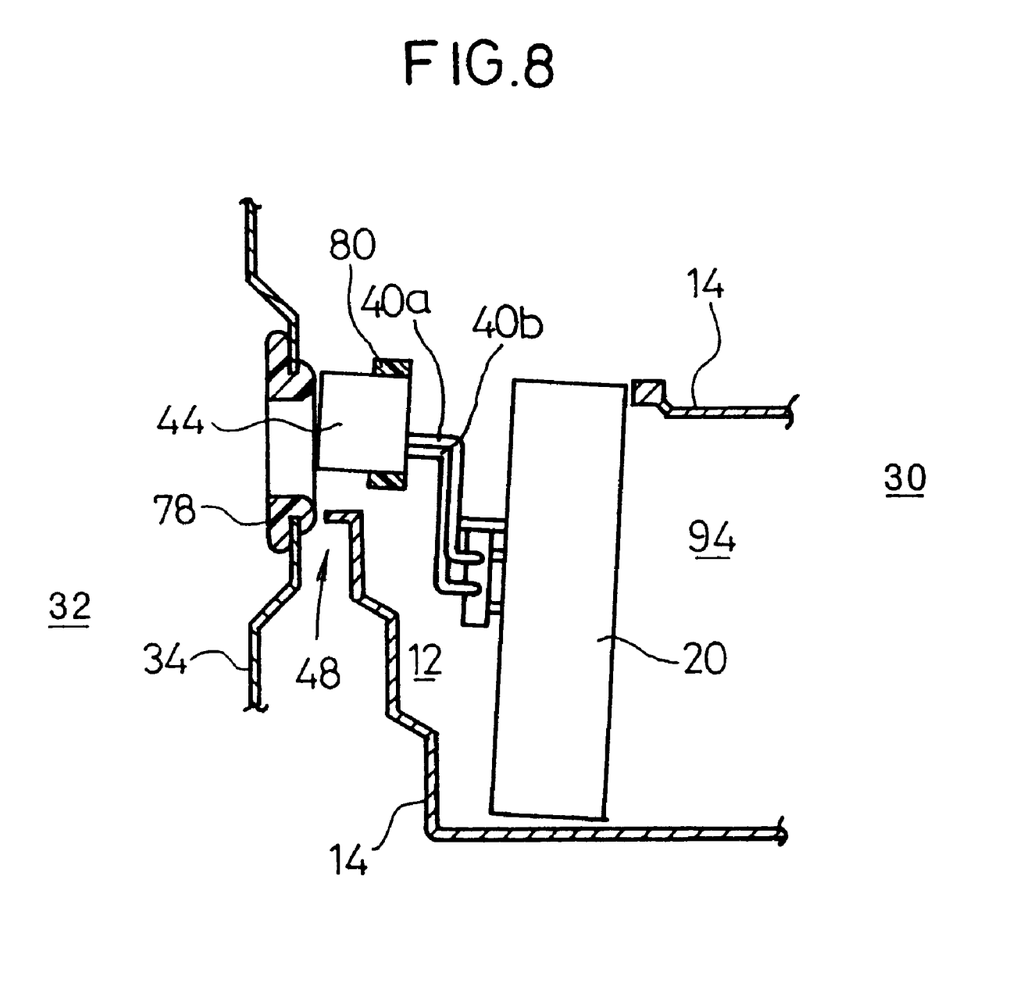
FIG. 8 is a transverse cross-sectional view of the structure shown in FIG. 7 from which a blower and a maintenance lid are removed.

As shown in FIGS. 7 and 8, for retracting the block joint 44 toward the evaporator 20, the heater unit housing 14 should preferably have a space 94 defined therein for moving the evaporator 20. Specifically, the space 94 should preferably be positioned in the heater unit housing 14 remotely from the block joint 44 for allowing the evaporator 20 to be either translated backward into the heater unit housing 14 or moved backward in an attitude slightly inclined with respect to the dashboard panel 34. The space 94 permits the evaporator 20 to be removed easily from within the heater unit housing 14.

Figure 9:
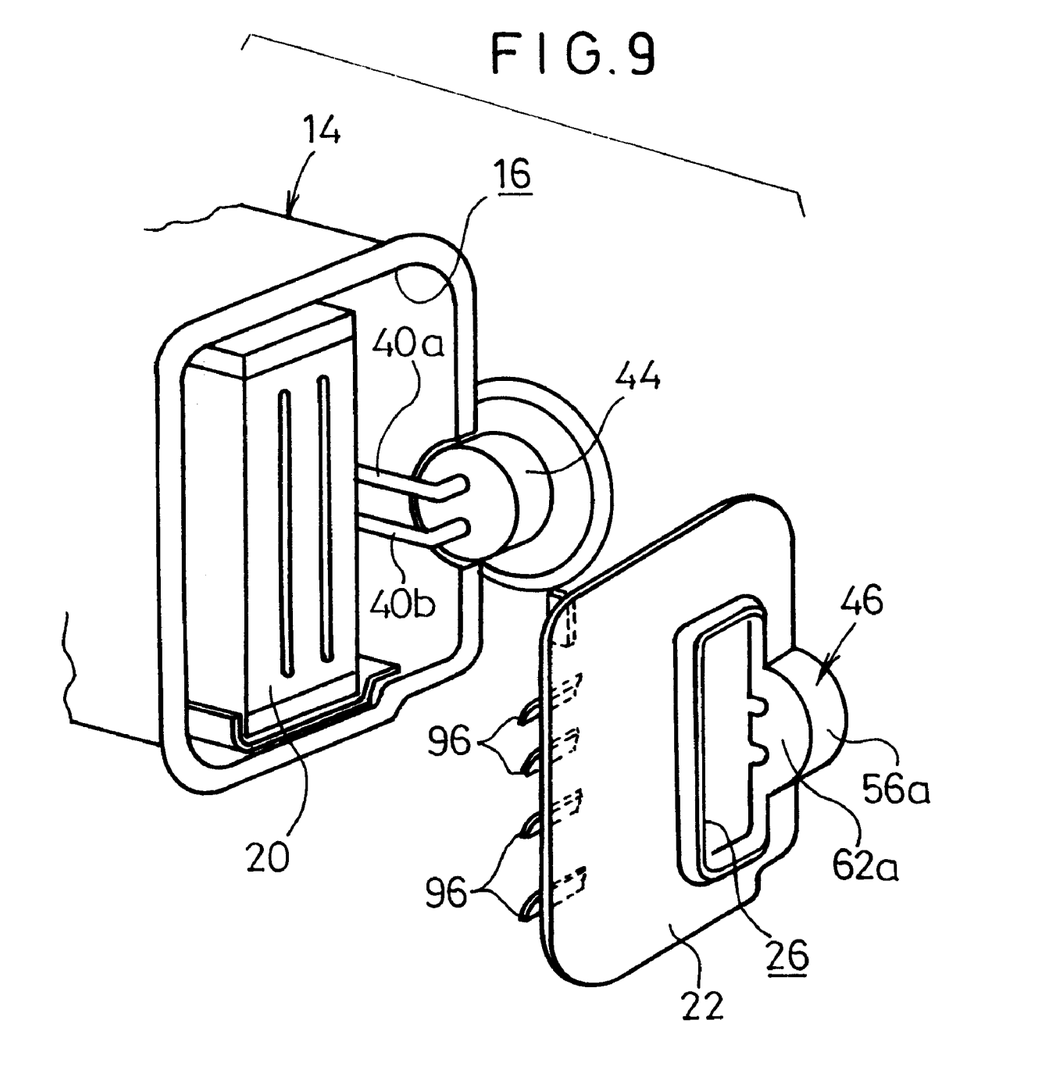
FIG. 9 is an exploded perspective view showing a plurality of pressers for pressing the evaporator in position.

To define the space 94 in the heater unit housing 14, it is preferable for the maintenance lid 22 to have a plurality of pressers 96 (see FIG. 9) projecting toward the evaporator 20 and inclined downwardly through a predetermined angle. The pressers 96 are integral with the maintenance lid 22 and have respective slanted surfaces 98 (see FIG. 7) for engaging the evaporator 20 to press the evaporator 20 toward the dashboard panel 34. When the maintenance lid 22 is removed from the opening 16 in the heater unit housing 14, the pressers 96 are spaced from the evaporator 20, defining the space 94 to allow the evaporator 20 to move backward. The pressers 96 are inclined downwardly for venting and water dripping.

Although certain preferred embodiments of the present invention have been shown and described in detail, it should be understood that various changes and modifications may be made therein without departing from the scope of the appended claims.

What is claimed is:

1. A piping joint structure comprising:
  a unit housing having an opening and a space defined therein, and a first device disposed inside said space;
  a cover member detachably fitted into the opening of said unit housing;
  a first joint member connected to and communicating with said first device through first pipes;
  a second joint member connected to and communicating with a second device disposed outside of said unit housing through second pipes, said second joint member being sealingly connected to said first joint member at a position outside of said unit housing, thereby providing fluid communication between said first pipes and said second pipes;

a first holder defined in said cover member and holding said first joint member; and a second holder defined in said unit housing and holding said first joint member;

said unit housing and said cover member having respective recesses which receive said first joint member held by said first holder and said second holder.

2. A piping joint structure according to claim 1, wherein said first holder and said second holder abut each other and jointly surround said first joint member, thereby holding said first joint member.

3. A piping joint structure according to claim 2, wherein said first joint member includes an outer circumferential surface, said first holder and said second holder having respective curved portions extending along said outer circumferential surface of said first joint member, and respective engaging portions surrounding said first joint member, said first holder and said second holder defining said recesses, respectively, in surrounding relation to said outer circumferential surface of said first joint member.

4. A piping joint structure according to claim 1, wherein said unit housing includes a panel, said panel having a through hole defined therein, and said first joint member has a seal member held against said panel, for hermetically closing said through hole.

5. A piping joint structure according to claim 1, wherein said unit housing has a space defined therein for allowing movement of said first device in unison with said first joint member.

6. A piping joint structure according to claim 1, wherein said cover member has a plurality of integral pressers defined thereon on a side facing said first device, said pressers comprising respective slanted surface engaging said first device to press the first device toward said unit housing.

7. A piping joint structure according to claim 6, wherein said unit housing has a space defined therein for allowing movement of said first device when said cover member is removed from the opening of said unit housing to separate said pressers from said first device.

8. A piping joint structure according to claim 6, wherein each of said pressers is inclined downwardly through a predetermined angle and projects toward said first device.

9. A piping joint structure in a motor vehicle having a passenger's compartment and an engine compartment which are separated from each other by a dashboard panel having a through hole, comprising:

a unit housing having space defined therein and housing an evaporator therein, and an opening defined therein for removal of said evaporator from said space through said opening;

a maintenance lid detachably mounted in the opening of said unit housing;

a first joint member disposed in the passenger's compartment and communicating with said evaporator;

a second joint member communicating with an air-conditioning unit disposed inside said engine compartment, said second joint member being sealingly connected to said first joint member from a position inside said engine compartment and through the through hole in the dashboard panel;

a first holder disposed in said passenger's compartment and defined in and end of said maintenance lid cover closer to said dashboard panel; and a second holder defined in a side panel of said unit housing which faces said dashboard panel, said first holder and said second holder jointly holding said first joint member.

10. A piping joint structure according to claim 9, wherein said first joint member includes an outer circumferential surface, said first holder and said second holder having respective curved portions extending along said outer circumferential surface of said first joint member, and respective engaging portions surrounding said first joint member, said first holder and said second holder defining respective recesses in surrounding relation to said outer circumferential surface of said first joint member, said first holder and said second holder abutting each other when said maintenance lid is mounted in the opening of the unit housing.

11. A piping joint structure according to claim 10, wherein said first joint member has a seal member disposed on the outer circumferential surface thereof and held against said dashboard panel for thereby hermetically closing said through hole.

12. A piping joint structure according to claim 9, wherein said first joint member and said second joint member are detachably joined to each other through a joint surface disposed in said passenger's compartment, thereby enabling said evaporator to be displaced substantially parallel to said dashboard panel and out of the space in said unit housing after said first joint member has been spaced a predetermined distance within said passenger's compartment from said dashboard panel.

13. A piping joint structure according to claim 9, wherein said unit housing has a space defined therein for allowing movement of the evaporator therein to space said first joint member away from said dashboard panel.

14. A piping joint structure according to claim 9, wherein said maintenance lid has a plurality of integral pressers defined thereon on a side facing said evaporator, said pressers comprising respective slanted surfaces engaging said evaporator to press the evaporator toward said dashboard panel and hold the evaporator.

15. A piping joint structure according to claim 14, wherein said unit housing has a space defined therein for allowing movement of said evaporated when said maintenance lid is removed from the opening of said unit housing to space said pressers from said evaporator.

16. A piping joint structure according to claim 14, wherein each of said pressers is inclined downwardly through a predetermined angle and projects toward said evaporator.

* * * * *